United States Patent
Prejean

(10) Patent No.: US 6,988,588 B2
(45) Date of Patent: Jan. 24, 2006

(54) CLIMBING TREE STAND

(76) Inventor: L. Wayne Prejean, 291 Tanner Rd., Searcy, AR (US) 72143

(*) Notice: Subject to any disclaimer, the term of this patent is extended or adjusted under 35 U.S.C. 154(b) by 0 days.

(21) Appl. No.: 10/214,261

(22) Filed: Aug. 7, 2002

(65) Prior Publication Data
US 2003/0029675 A1 Feb. 13, 2003

Related U.S. Application Data
(60) Provisional application No. 60/310,958, filed on Aug. 8, 2001.

(51) Int. Cl.
A63B 27/00 (2006.01)

(52) U.S. Cl. .................................. 182/136; 182/187
(58) Field of Classification Search ................ 182/135, 182/136, 187, 188, 116
See application file for complete search history.

(56) References Cited

U.S. PATENT DOCUMENTS

| | | |
|---|---|---|
| 306,607 A | 10/1884 | Harrington |
| 3,485,320 A | 12/1969 | Jones |
| 3,630,314 A | 12/1971 | Bamburg |
| 3,871,482 A | 3/1975 | Southard |
| 4,243,121 A | 1/1981 | Kiss et al. |
| 4,249,683 A | 2/1981 | Park |
| 4,321,983 A | 3/1982 | Nelson |
| 4,331,216 A | 5/1982 | Amacker |
| 4,377,270 A | 3/1983 | Kolongowski |
| 4,542,873 A | 9/1985 | Matherly et al. |
| 4,545,460 A | 10/1985 | Byrd |
| 4,726,447 A | 2/1988 | Gibson et al. |
| 4,744,441 A | 5/1988 | Sandstrom |
| 4,762,200 A | 8/1988 | Andrews et al. |
| 4,782,918 A | 11/1988 | Brunner et al. |
| 4,813,441 A | 3/1989 | Kepley |
| 4,991,690 A | 2/1991 | Woller |

(Continued)

FOREIGN PATENT DOCUMENTS

| | | |
|---|---|---|
| FR | 1505187 | 10/1967 |
| FR | 2627-175 A | 2/1988 |
| FR | 2657-021 A | 1/1990 |
| FR | 2686023 A1 | 9/1992 |
| WO | WO 93/00967 | 1/1993 |

Primary Examiner—Alvin Chin-Shue
(74) Attorney, Agent, or Firm—Young & Basile, P.C.

(57) ABSTRACT

A climbing tree stand platform including a platform member, the platform member having an inner end for engaging a tree and an outer end, and two sides opposite one another connecting the inner end and the outer end, the platform member having two pivot arm support members rigidly connected thereto and extending upward therefrom toward the inner end of the platform member, each of the pivot arm support members having a pivot arm pivotally connected thereto for pivoting toward and contacting opposite sides of the tree as a downward force is applied to the platform member, each of the two pivot arms being adapted to receive a flexible connector removably connected to each of the two pivot arm support members for extension around the tree to hold the platform member to the tree.

30 Claims, 10 Drawing Sheets

U.S. PATENT DOCUMENTS

| | | |
|---|---|---|
| 5,016,732 A | 5/1991 | Dunn |
| 5,040,635 A | 8/1991 | Strickland |
| 5,050,704 A | 9/1991 | Olsson |
| 5,070,620 A | 12/1991 | Crain et al. |
| 5,080,193 A | 1/1992 | Woof |
| 5,101,934 A | 4/1992 | Zumbro |
| 5,103,935 A | 4/1992 | Amacker |
| 5,113,973 A | 5/1992 | Southern |
| 5,156,236 A | 10/1992 | Gardner |
| 5,167,298 A | 12/1992 | Porter |
| 5,186,276 A | 2/1993 | Craig |
| 5,226,505 A * | 7/1993 | Woller et al. ............... 182/187 |
| 5,234,076 A | 8/1993 | Louk et al. |
| 5,265,780 A | 11/1993 | Matthews et al. |
| 5,316,104 A | 5/1994 | Amacker |
| 5,379,861 A | 1/1995 | Amacker |
| 5,439,072 A | 8/1995 | Jenkins, Jr. |
| 5,482,137 A | 1/1996 | McNeill |
| 5,492,198 A * | 2/1996 | Williams ................... 182/136 |
| 5,515,574 A | 5/1996 | Larson |
| 5,579,557 A | 12/1996 | Boden |
| 6,308,801 B1 * | 10/2001 | Futch ........................ 182/136 |

\* cited by examiner

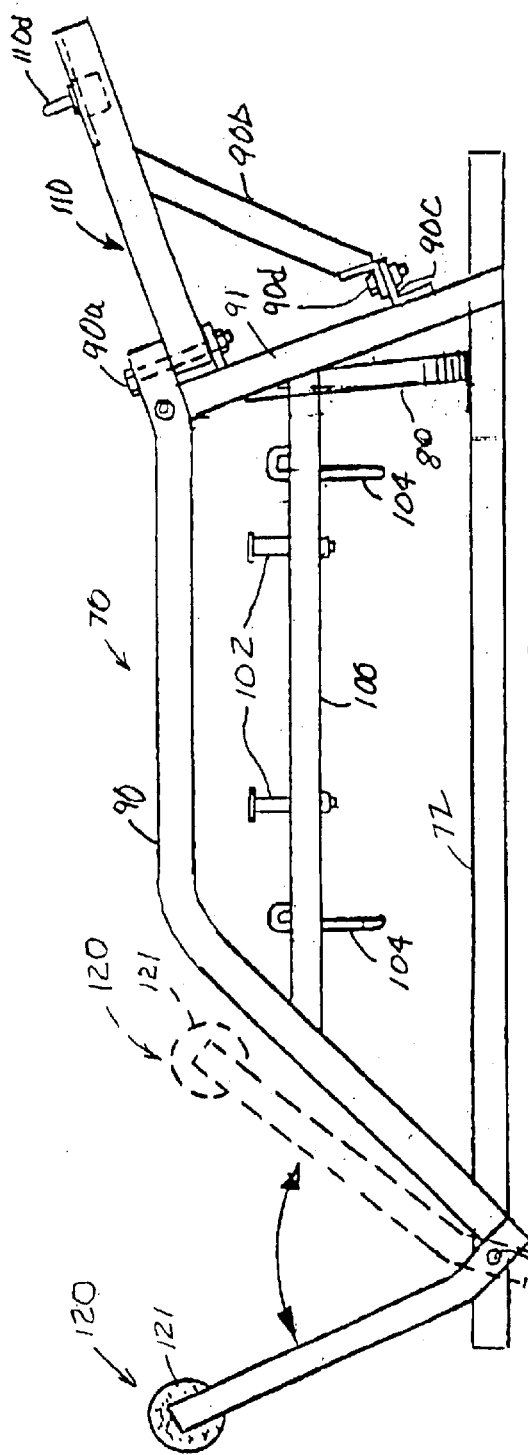
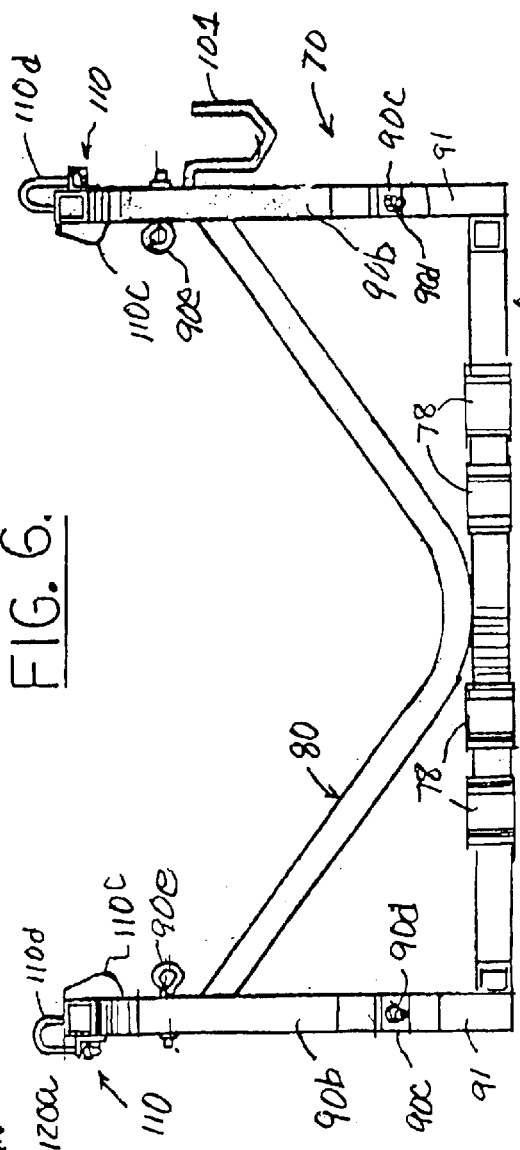
FIG. 6.
FIG. 7.

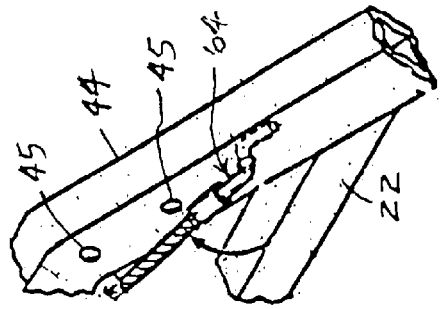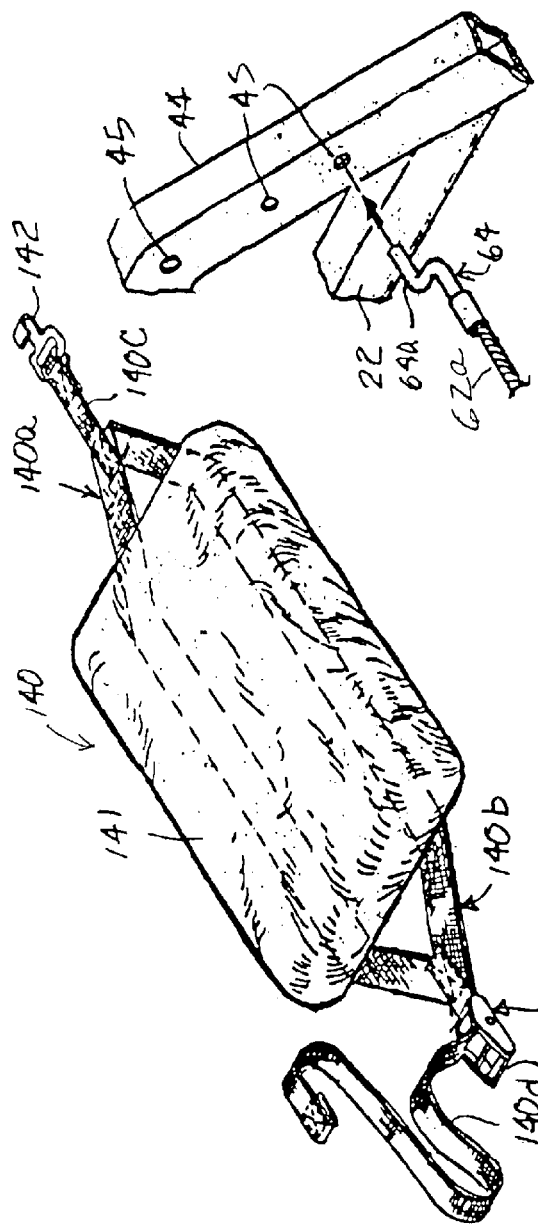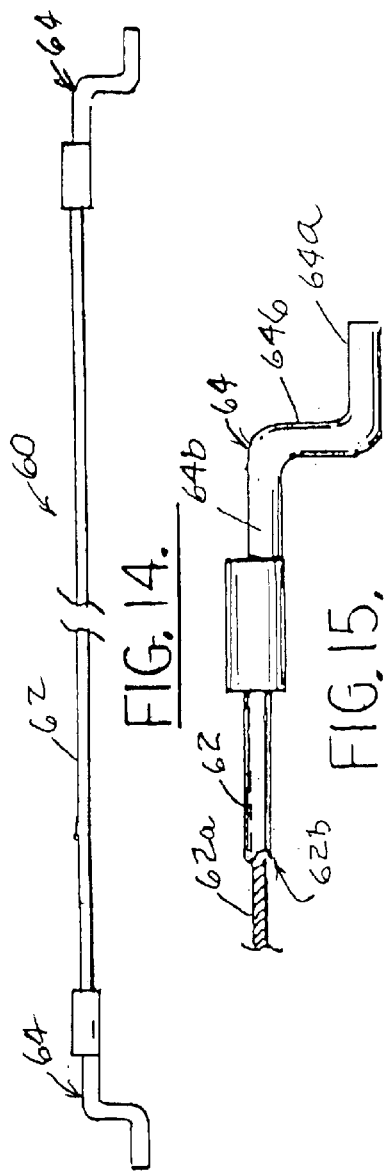

CLIMBING TREE STAND

CROSS-REFERENCE TO RELATED APPLICATIONS

This application claims the benefit of the filing date and priority of co-pending provisional application Ser. No. 60/310,958 filed Aug. 08, 2001.

BACKGROUND OF THE INVENTION

1. Field of the Invention

The present invention relates to climbing tree stands such as those used by deer hunters, naturalists, and outdoor photographers. In particular, the invention relates to climbing tree stands for hunters.

2. Description of the Related Art

Climbing tree stands are well known in the art. Such stands may be placed on a tree or pole and used to elevate the hunter or other user to a desired height for viewing and hunting game animals such as deer.

Climbing tree stands generally have a lower climbing member upon which the hunter stands and an upper climbing member upon which the hunter sits. Each of the upper and lower climbing members have a jaw, blade or other device for encircling the tree to which the climbing member is attached. Each of the jaws or blades bite into the tree to hold each of the climbing members in place after the tree stand is located in the desired position on the tree.

One of the major problems encountered with climbing stands is the possibility of loosing the lower climbing member with no way to retrieve it when the stand is elevated above the ground.

An additional problem encountered with climbing tree stands occurs when the user steps too close to the tree on the lower climbing member, causing the lower climbing member to lose its bite or connection to the tree and slide down the tree. Loss of connection of the lower climbing member to the tree can result in serious or deadly injuries as the user slides down the tree.

Foot straps found on climbing tree stands of the prior art secure the user's feet to the lower climbing member in an attempt to control the position of the lower climbing member. Installing foot straps is very awkward due to body position and large hunting boots. Due to the location of the foot straps the user is placed in a very hazardous position if applied leverage is needed to secure the lower climbing member. If the user's feet were strapped into a position near the tree, the user would not be able to step backward onto the front of the lower climbing member to increase the leveraged bite. Furthermore, foot straps force the user to bend down to release the foot straps at significant elevations above the ground, which may result in the user applying pressure to his toes for balance and releasing the bite on the tree of the lower climbing member and sliding to the ground.

Securing the upper climbing member at elevations above the ground is a problem because the upper climbing member does not have the user's weight thereon as the lower climbing member does. Therefore, when the user moves upward, the upper climbing member may be struck and released from the tree causing it to fall on top of the lower climbing member.

Exemplary of the related art are the following U.S. Pat. Nos.: 5,579,557; 5,515,574; 5,482,137; 5,439,072; 5,379,861; 5,316,104; 5,265,780; 5,234,076; 5,186,276; 5,167,298; 5,156,236; 5,113,973; 5,103,935; 5,101,934; 5,080,193; 5,070,620; 5,050,704; 5,040,635; 5,016,732; 4,991,690; 4,813,441; 4,782,918; 4,762,200; 4,744,441; 4,726,447; 4,545,460; 4,542,873; 4,377,270; 4,331,216; 4,321,983; 4,249,683; 4,243,121; 3,871,482; 3,630,314; 3,485,320; and 306,607; and the following foreign patents: France 2,686,023; 2,657,021; 2,627,175; 1,505,187; Switzerland 359102; and World 93,000,967.

SUMMARY OF THE INVENTION

In accordance with the present invention there is provided a climbing tree stand platform including a platform member, the platform member having an inner end for engaging a tree and an outer end, and two sides opposite one another connecting the inner end and the outer end, the platform member having two pivot arm support members rigidly connected thereto and extending upward therefrom toward the inner end of the platform member, each of the pivot arm support members having a pivot arm pivotally connected thereto for pivoting toward and contacting opposite sides of the tree as a downward force is applied to the platform member, each of the two pivot arms being adapted to receive a flexible connector removably connected to each of the two pivot arm support members for extension around the tree to hold the platform member to the tree.

BRIEF DESCRIPTION OF THE DRAWINGS

FIG. 6 is a cross-sectional view taken along lines 6—6 of FIG. 5;

FIG. 7 is a cross-sectional view taken along lines 7—7 of FIG. 5;

FIG. 12 is a perspective view of the detachable seat of the invention;

FIG. 13A is a perspective, partly cut-away, view of the fastener of the flexible connector of the invention aligned for insertion and connection to the seating or standing platform of the invention;

FIG. 13B is a perspective, partly cut-away, view of the fastener of the flexible connector utilized in the invention insertion and connection to the seating or standing platform of the invention;

FIG. 14 is a plan view, partly cut-away, of the flexible connector assembly of the invention;

FIG. 15 is an enlarged plan view, partly cut-away, of an end of the flexible connector assembly of the invention;

DETAILED DESCRIPTION OF THE INVENTION

Figure 1:
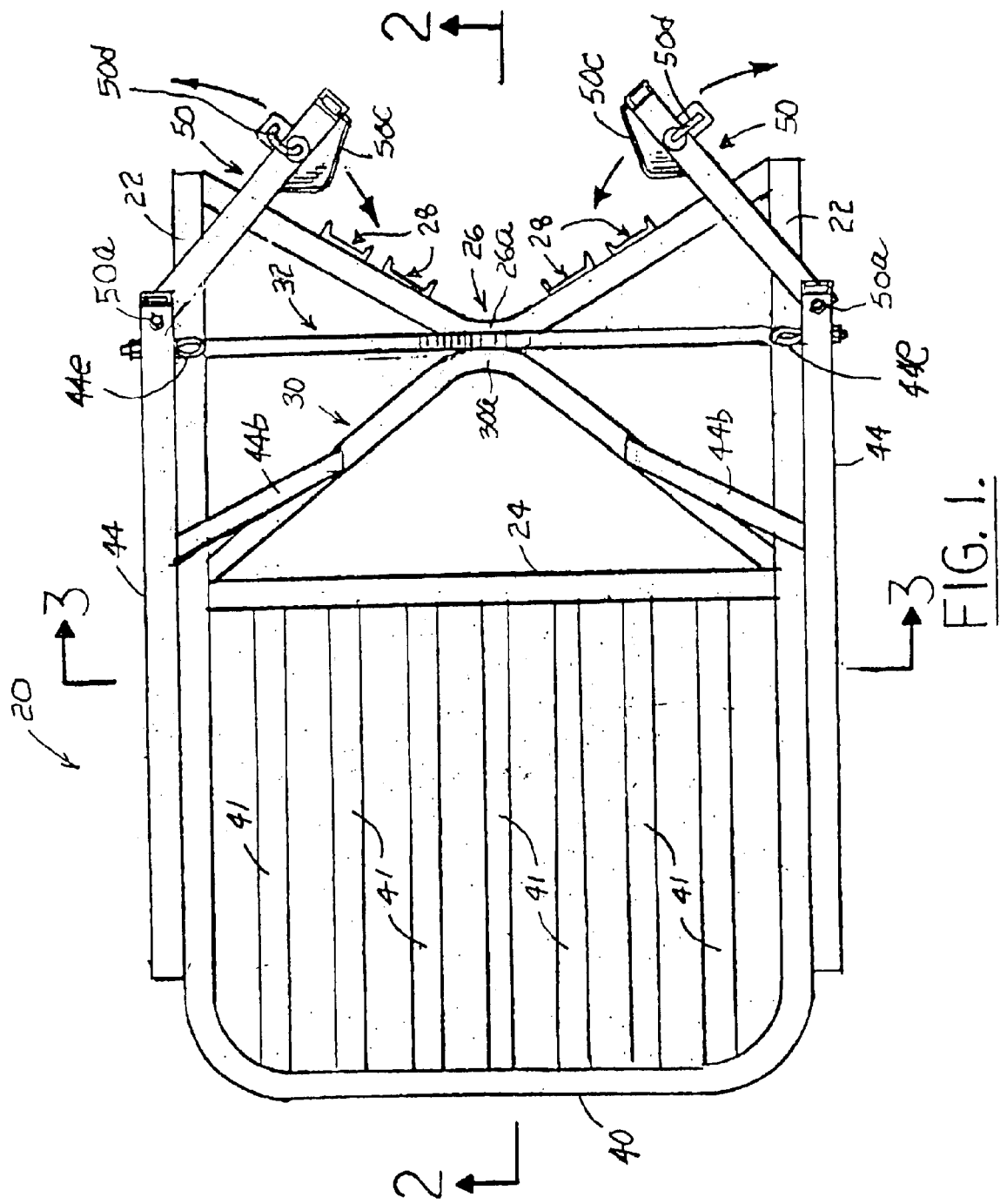
FIG. 1 is a top plan view of the standing platform of the invention.
Figure 16:
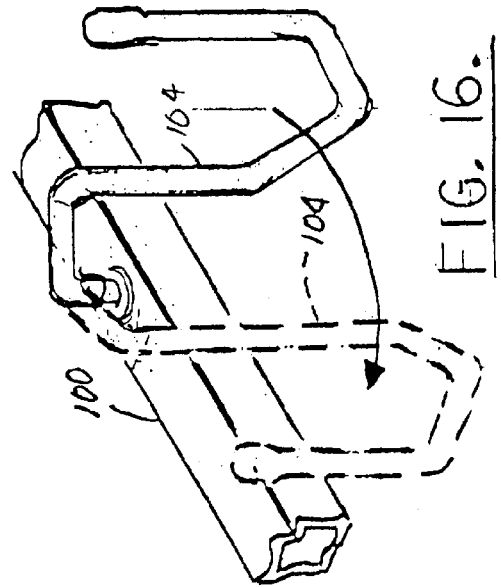
FIG. 16 is a perspective view, partly cut-away, of one of the rotating holders of the seating platform of the invention.

Referring now to the drawings, and in particular to FIG. 1, there is shown the standing platform of the invention generally indicated by the numeral 20. Standing platform 20 is also shown in FIGS. 2–4, 9–11, and 17. Standing platform 20 has two spaced-apart parallel side rails 22—22 connected by a cross-rail 24 aligned perpendicular thereto in the approximate middle thereof.

At the inner, or tree contacting end thereof, is a generally V-shaped tree contacting member generally indicated by the numeral 26. Tree contacting member 26 is rigidly connected to each inner end of parallel side rails 22—22 and preferably lies in a plane therewith. Tree contacting member 26 preferably has a plurality of toothed members such as rectangular channels 28—28 which bite into the trunk of tree or pole 300 to aid in preventing standing platform 20 from sliding thereon or rotating therearound. However, rectangular channels 28—28 could be replaced if desired by other conventional tree contacting members known in the art such as blades or the like.

Figure 2:
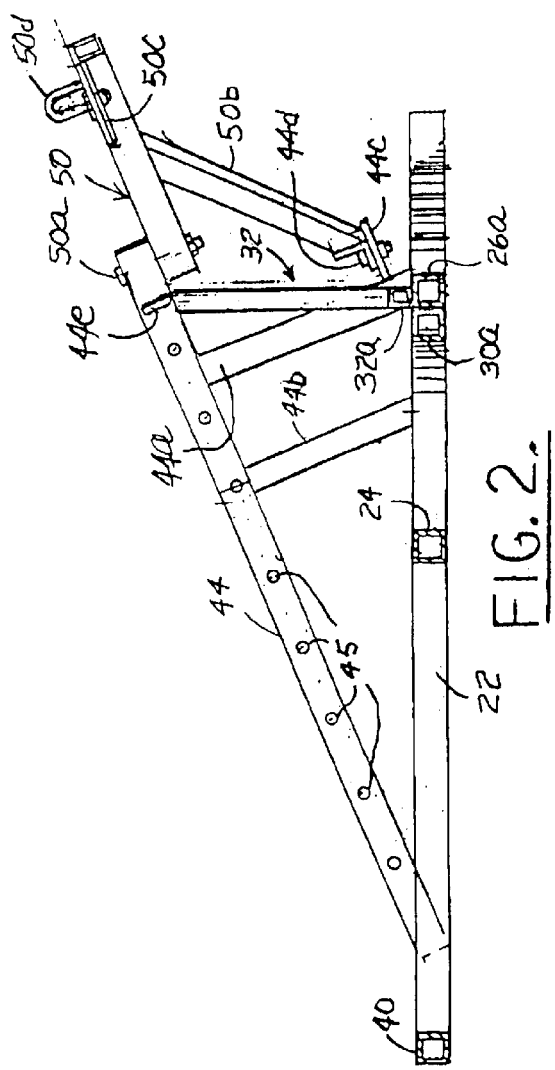
FIG. 2 is a cross-sectional view taken along lines 2—2 of FIG. 1.
Figure 4:
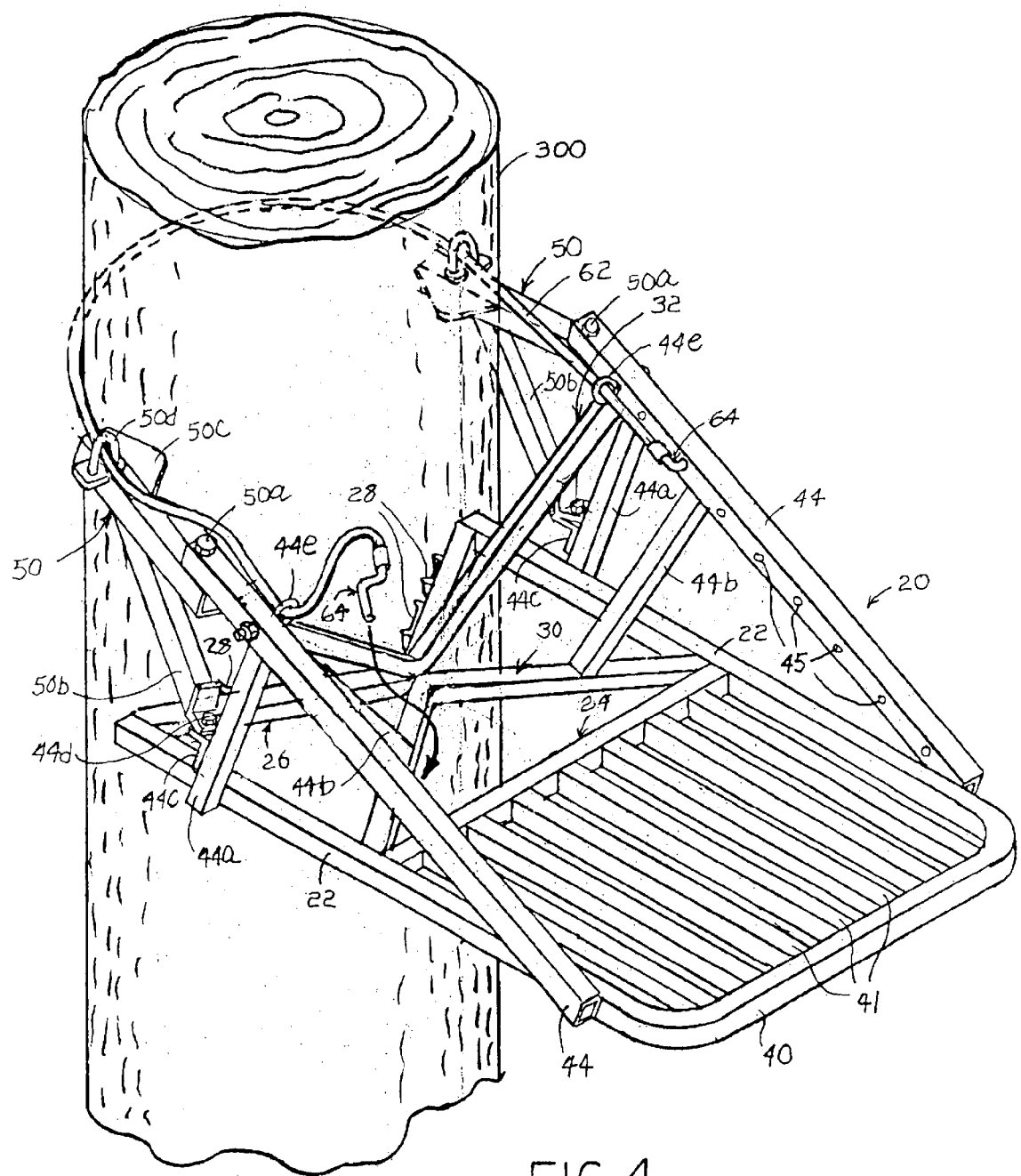
FIG. 4 is perspective view, partly cut-away, of the standing platform of the invention connected to a tree showing connection of the flexible connector around a tree and to the platform.
Figure 5:
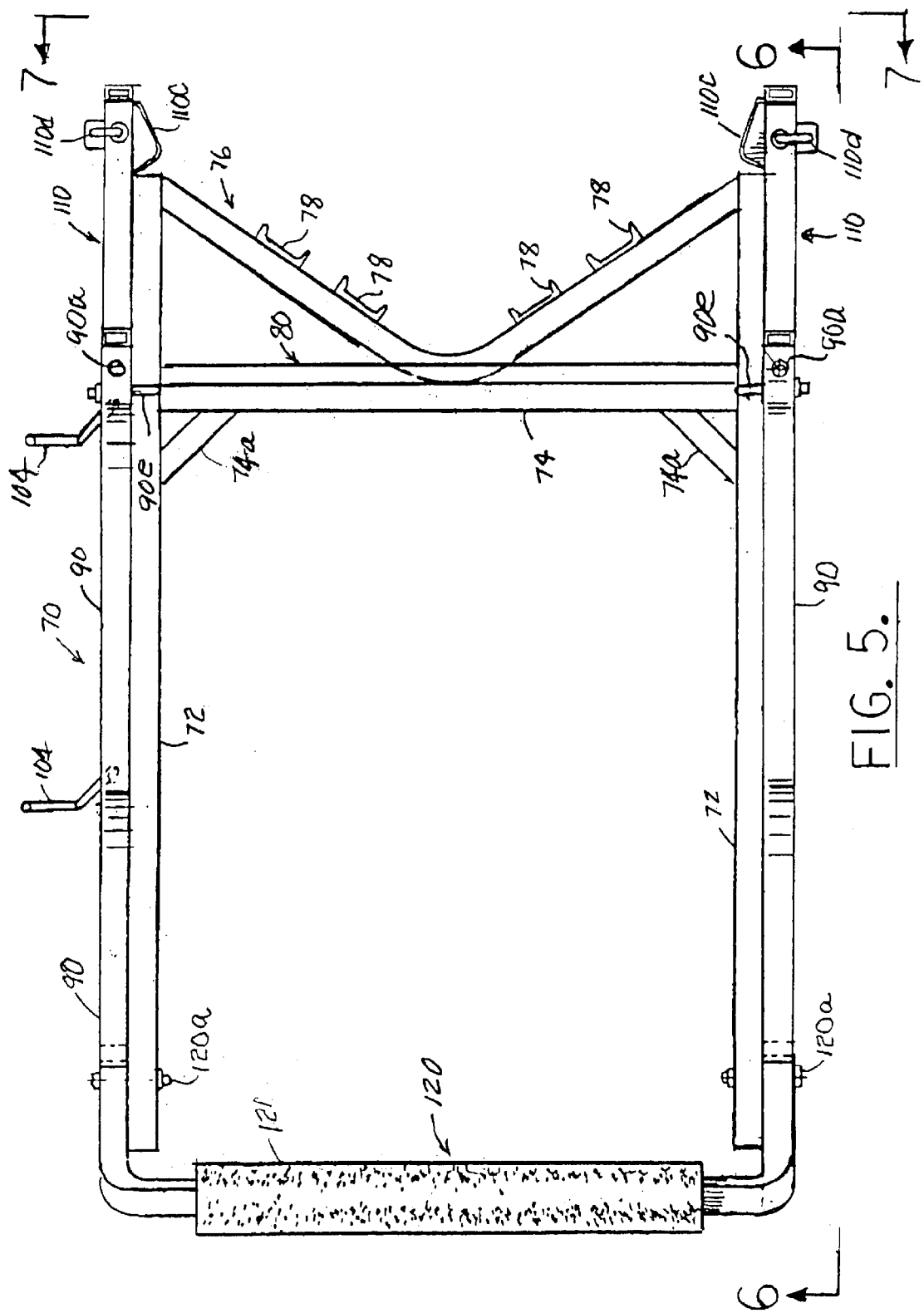
FIG. 5 is a top plan view of the seating platform of the invention.

A second preferably generally V-shaped bracing member generally indicated by the numeral 30 is rigidly connected to each of the parallel side rails 22—22 and preferably lies in the plane therewith. Bracing member 30 is also preferably rigidly connected at its apex 30a to the apex of tree contacting member 26 as shown in FIGS. 1, 2, and 4.

A third preferably generally V-shaped bracing member generally indicated by the numeral 32 is rigidly connected at its ends to pivot arm support members 44—44 and preferably lies in a plane perpendicular to the plane containing parallel side rails 22—22. Bracing member 32 is also preferably rigidly connected at its apex 32a to the apex 26a of tree contacting member 26 as shown in FIGS. 1, 2, and 4.

Figure 3:
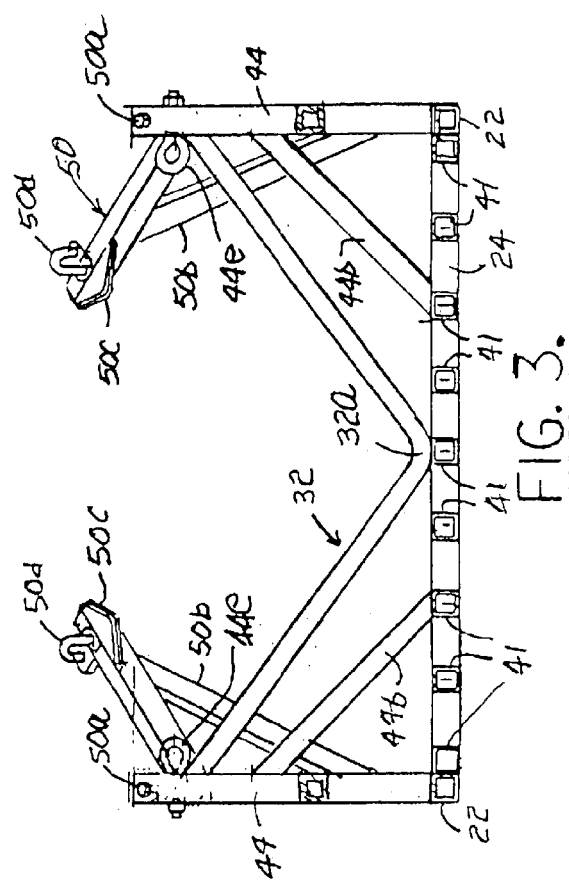
FIG. 3 is a cross-sectional view taken along lines 3—3 of FIG. 1.

Preferably, standing platform 20 has second cross-rail 40 connecting the two spaced-apart parallel side rails 22—22 aligned perpendicular thereto at the outer end thereof as shown in FIG. 1. Most preferably, cross-rail 40 is formed integrally with side rails 22—22 from a continuous piece of elongated, hollow rail material having a rectangular cross-section as shown in FIGS. 1–3.

Extending between cross-rail 24 and cross-rail 40 are a plurality of rigid, spaced-apart parallel members 41—41 which support the feet of the user when standing or sitting as shown in FIGS. 1 and 9–11.

Extending upward at an acute angle from side rails 22—22 are two pivot arm support members 44—44. Each of the pivot arm support members 44—44 preferably lie in a plane which is perpendicular to the plane in which side rails 22—22 lie, and each of the outer ends of pivot arm support members 44—44 are rigidly connected to side rails 22—22.

Figure 9:
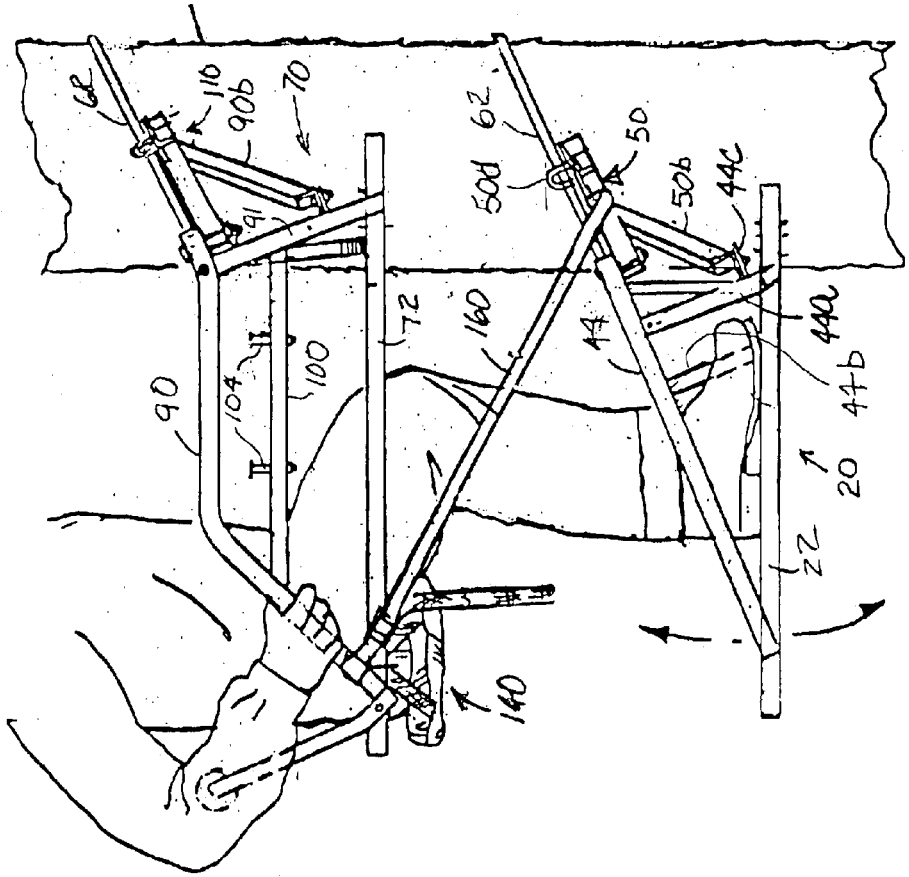
FIG. 9 is a side elevational view, partly cut-away, of the standing platform and the seating platform of the invention connected to a tree with the user facing the tree.

Each of the pivot arm support members 44—44 are connected to brace members 44a—44a which are rigidly connected to pivot arm support members 44—44 and to side rails 22—22 to provide additional support and rigidity to pivot arm support members 44—44. Additional support for pivot arm support members 44—44 is also provided by foot receiving members 44b—44b which are rigidly connected to pivot arm support members 44—44 and to V-shaped bracing member 30. Foot receiving members 44b—44b are also configured to receive each foot of the user therein to enable the user raise or lower standing platform 20 when seated as indicated in FIG. 9 without the difficulty of bending down and installing foot straps as taught in the prior art. Furthermore, foot receiving members 44b—44b offer the user better control of standing platform 20 when climbing due to solid contact of the feet of the user with the standing platform 20 on four sides of each foot.

Pivotally connected to the inner ends of each of the two pivot arm support members 44—44 is a pivot arm generally indicated by the numeral 50. Pivot arms 50—50 are pivotally connected to the inner ends of the two pivot arm support members 44—44 by bolts 50a—50a. Pivot arms 50—50 have pivot arm braces 50b—50b rigidly connected thereto at one end thereof for additional strength and support. Pivot arm braces are pivotally connected to members 44a—44a as shown in the drawings by brackets 44c—44c, which are rigidly connected to members 44a—44a, and bolts 44d—44d.

Pivot arms 50—50 have a generally triangular tree contacting members 50c rigidly connected thereto which bite into the tree and prevent pivot arms 50 from slipping thereon. Preferably tree contacting members 50c are flat plates with a tapered outer edge for biting into a tree. Pivot arms 50—50 also have a guide 50d connected thereto for receipt of the flexible connector assembly generally indicated by the numeral 60 shown in detail in FIG. 14 and 15.

Figure 8:
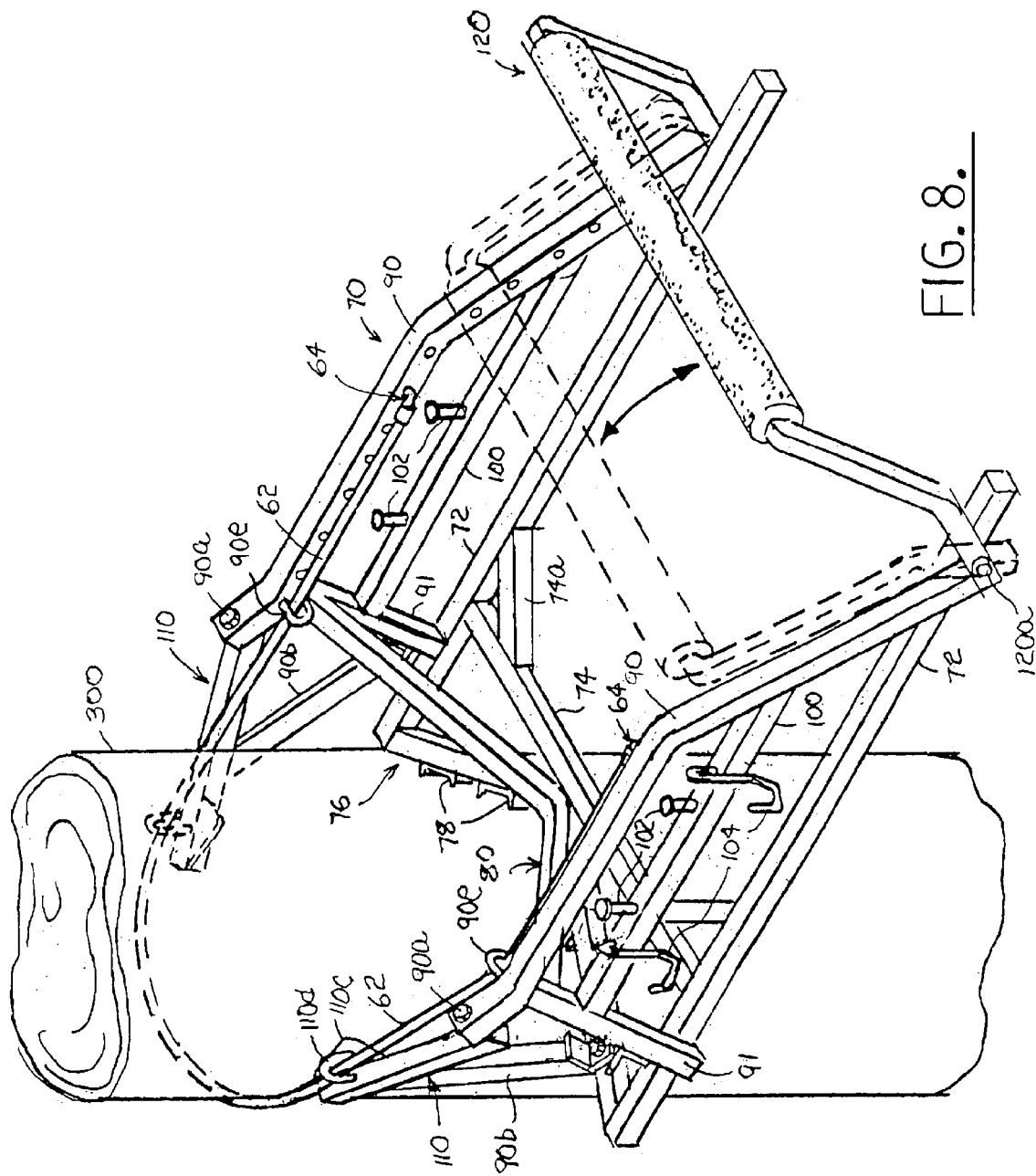
FIG. 8 is a perspective view, partly cut-away, of the seating platform of the invention connected to a tree showing a rotatable safety rest movable between a first position and a second position shown in phantom lines.

Connector assembly 60 of the invention includes a flexible connector 62 having a fastener generally indicated by the numeral 64 bonded thereto at each end thereof. As shown in detail in FIG. 15, fastener 64 has two parallel, rigid arms 64a and 64b connected perpendicular to third rigid arm 64c for connection to pivot arm support members 44 by insertion of arm 64a into one of the holes 45 in pivot arm support members 44 and 90 as shown in FIGS. 13a, 13b, and FIG. 8. Thus, a user of the climbing tree stand of the invention can quickly adjust the length of flexible connector 62 extending from standing platform 20 and climbing platform 70. This system enables fast and easy connection of the standing platform 20 and climbing platform 70 to a tree at ground level prior to climbing the tree, and enables quick and easy adjustment at higher elevations on a tree. Furthermore, this system is inherently safer since fastener 64 cannot be lost at elevation during the climbing process. Fastener 64 may be replaced with various other types of connecters which penetrate into frame members and lock therein. Flexible connector 62 may be any conventional connector material 62a well known in the art such as a cable, wire, rope, cord, chain, belt or the like, and preferably has a plastic polymeric coating generally indicated by the numeral 62b thereon to prevent abrasion of the tree which it contacts and abrasion of the hands of the user.

Pivot arm support members 44—44 each have a flexible connector guide 44e therein for receipt of connector 62. Guide 44e also keeps the flexible connector 62 routed along the outside edge of the platforms 20 and prevents flexible connector 62 from contacting the user and restricting movement of the user inside the platform 20.

Referring now in particular to FIGS. 5–8, there is shown the seating platform of the invention generally indicated by the numeral 70. Seating platform 70 is also shown in FIGS. 9–11 and 17. Seating platform 70 has two spaced-apart parallel side rails 72—72 connected by a cross-rail 74 aligned perpendicular thereto near the inner end thereof. Support braces 74a—74a are rigidly connected to side rails 72 and cross-rail 74 to provide additional rigidity and strength.

At the inner, or tree contacting end thereof, is a generally V-shaped tree contacting member generally indicated by the numeral 76. Tree contacting member 76 is rigidly connected to each inner end of parallel side rails 72—72 and preferably lies in the plane therewith. Tree contacting member 76 preferably has a plurality of toothed members such as rectangular channels 78—78 which bite into the trunk of tree or pole 300 to aid in preventing seating platform 70 from sliding thereon or rotating therearound. However, rectangular channels 78—78 could be replaced if desired by other conventional tree contacting members known in the art such as blades or the like.

A second preferably generally V-shaped bracing member generally indicated by the numeral 80 is rigidly connected at its apex to tree contacting member 76 and cross rail 74 and is preferably oriented perpendicular thereto. Bracing member 80 is also preferably rigidly connected at its apex 80a to the apex 76a of tree contacting member 76 as shown in FIGS. 5–8.

Extending upward at an angle from side rails 72—72 are two pivot arm support members 90—90. Each of the pivot arm support members 90—90 preferably lie in a plane which is perpendicular to the plane in which side rails 72—72 lie, and each of the pivot arm support members 90—90 are rigidly connected at their outer ends to side rails 72—72.

Each of the pivot arm support members 90—90 are connected to brace members 90a—90a which are rigidly connected to pivot arm support members 90—90 and to side rails 72—72 to provide additional support and rigidity to pivot arm support members 90—90. Additional support for pivot arm support members 90—90 is also provided by V-shaped bracing member 80 which is rigidly connected at each end thereof to pivot arm support members 90—90.

Figure 11:
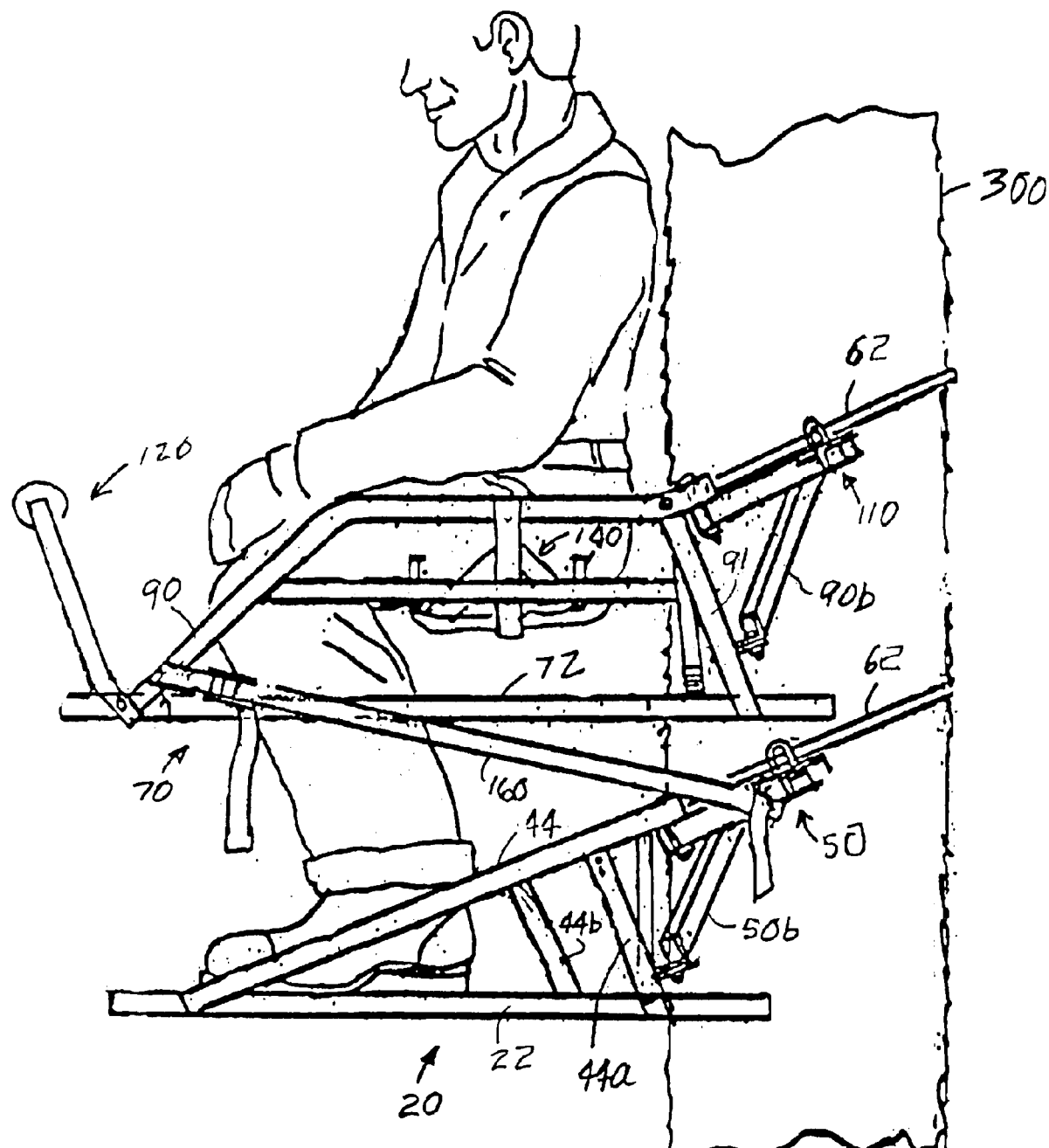
FIG. 11 is a side elevational view, partly cut-away, of the standing platform and the seating platform of the invention connected to a tree with the user's back to the tree.

An intermediate seat supporting member 100 is rigidly connected at one end to pivot arm support members 90—90 and at the other end to brace members 91—91. Seat supporting member 100 supports a seat as shown in FIG. 11, and accessory knobs 102—102 and rotating gun and quiver holders 104—104.

Pivotally connected to the inner ends of each of the two pivot arm support members 90—90 is a pivot arm generally indicated by the numeral 110. Pivot arms 110—110 are pivotally connected to the inner ends of the two pivot arm support members 90—90 by bolts 90a—90a. Pivot arms 110—110 have pivot arm braces 90b—90b rigidly connected thereto at the upper end thereof, and pivot arm braces 90b—90b are pivotally connected to brace members 91—91 as shown in FIGS. 6 and 7 by brackets 90c—90c, which are rigidly connected to brace members 91—91, and by bolts 90d—90d.

Pivot arms 110—110 have a generally triangular tree contacting member 110c rigidly connected thereto which bite into the tree 300 and prevent pivot arms 110 from slipping thereon. Pivot arms 110—110 also have a guide 110d connected thereto for receipt of the connector assembly generally indicated by the numeral 60 shown in detail in FIG. 14 and 15. Pivot arm support members 90—90 each have a connector guide 90e thereon for receipt of flexible connector 62 and holes 45 on the surface thereof for receipt of locking arm 64 of connector assembly 60 as shown in FIGS. 13A and 13B. Guide 90e also keeps flexible connector 62 routed along the outside edge of the platform 70 and prevents flexible connector 62 from contacting the user and restricting movement of the user inside the platform 70.

If desired, pivot arms 110—110 and pivot arm braces 90b could be eliminated from seating platform 70. The remaining elements of seating platform 70 would function as described.

Preferably, seating platform 70 has a rotatable safety rail generally indicated by the numeral 120, although rail 120 could be removed if desired. Rail 120 may function as a back rest or shooting support as desired, and is preferably U-shaped and has a soft material 121 therearound such a foam rubber. Rotatable rail 120 is pivotally connected to rails 72—72 by bolts 120a—120a.

In FIG. 12 is shown the detachable seat assembly of the invention generally indicated by the numeral 140. Seat assembly 140 has triangular belts generally indicated by the numerals 140a and 140b extending from opposite sides of seating member 141. Seating member 141 is preferably a cushion which is preferably generally rectangular in shape, although other desired shapes such as oval shaped cushion could be used if desired. Furthermore, seating member could be a flexible woven material such as a web or net if desired.

Figure 10:
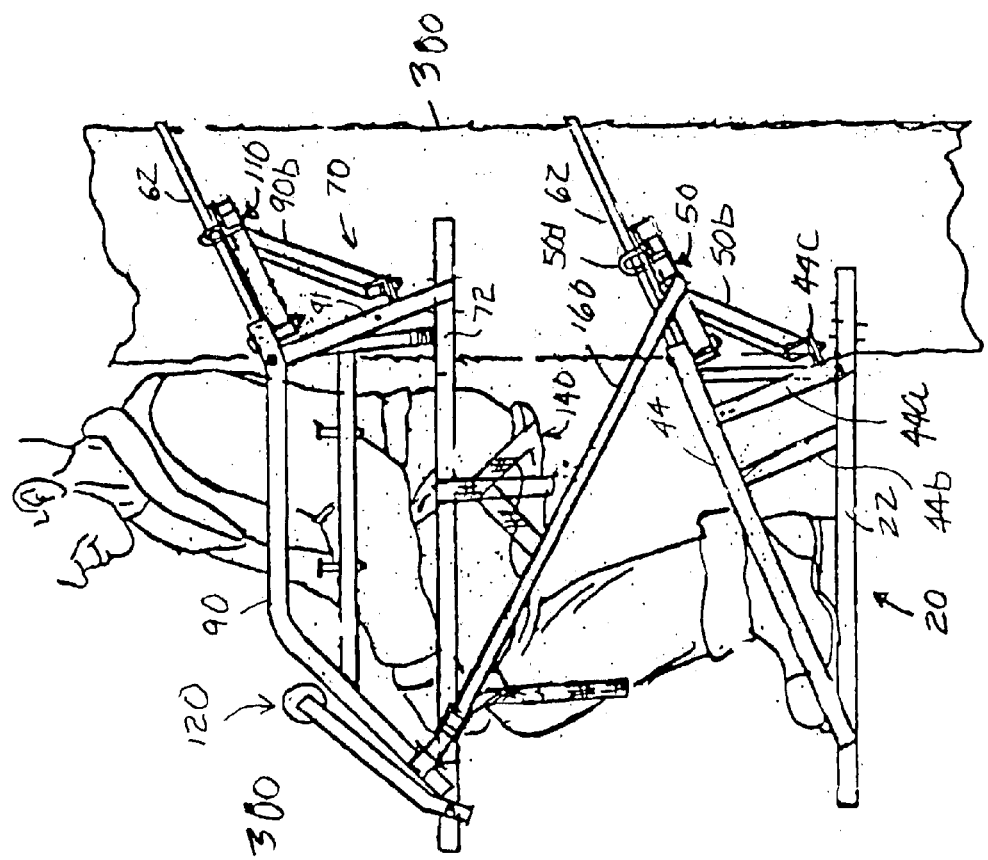
FIG. 10 is a side elevational view, partly cut-away, of the standing platform and the seating platform of the invention connected to a tree with the user's back to the tree.

Triangular belt 140a terminates in a strap 140c having a connector hook 142 thereon and triangular belt 140b extending from the opposite side thereof terminates in a strap 140d having an adjustable strap receiver generally indicated by the numeral 143 thereon for receipt of hook 142 to enable quick and easy movement of seat assembly 140 to the three positions shown in FIGS. 9–11. Adjustable strap receiver 143 is a conventional adjustable strap receiver well known in the art which can be moved to various positions on strap 140d and locked onto strap 140d at the desired position. Adjustable strap receiver 143 has a clasp 143a for receipt of hook 142 and enables the length of adjustable strap receiver 143 from cushion 141 to be changed as desired to fit the various positions of seat assembly 140 shown in FIGS. 9–11.

Detachable seat assembly 140 allows the hunter or other user many is options. For example, leaving the climbing tree stand at the base of a selected tree overnight is a common practice. This reduces packing labor if the hunter decides to return later for another hunt. However, human scent is implanted and concentrated in the seat cushion attached to the stand at ground level or nose level of the animals in the area which broadcasts the hunter's presence while the hunter is away from the stand site. The scent on the seat can inform animals in the area of the hunters presence and ruin his stand site for future use. Many seats and cushions of the climbing tree stands of the prior art are permanently attached to the stand and cannot be removed, whereas the detachable seat assembly 140 of the invention can be quickly detached and carried home with the hunter each time the hunter leaves the stand.

Figure 17:
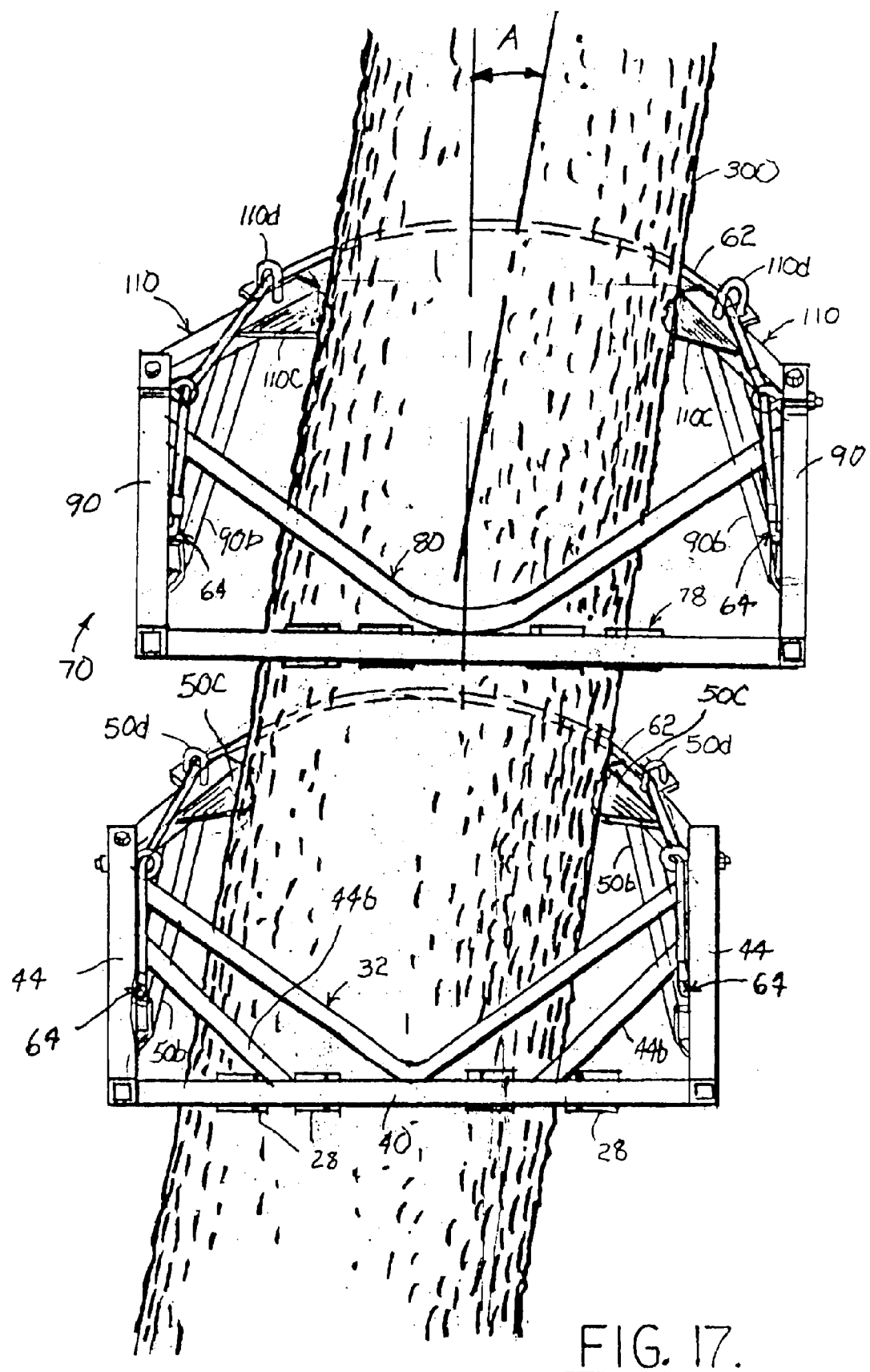
FIG. 17 is a front elevational view, partly cut-away, of the standing platform and the seating platform of the invention connected to a tree leaning at an angle A with the vertical wherein the seating platform is aligned horizontally parallel with the standing platform.

In FIG. 17 is shown a front elevational view, partly cut-away, of the standing platform 20 and the seating platform 70 of the invention connected to a tree 300 leaning at an angle A with the vertical wherein the seating platform 20 is aligned horizontally parallel with the standing platform 70. The pivot arms 50 and 110 pivot to the left or right for flexibility to conform with tree irregularities, thereby enabling the user to level the tree stand, i.e., align the seating platform 70 and standing platform 20 horizontal with the ground even on a leaning tree. In FIG. 17, the safety rail 120 and the seat 140 are shown removed for purposes of illustration, although it is preferred that the safety rail be attached at all times to seating platform 70 to prevent the hunter from falling from the tree 300.

As shown in FIG. 9, a user such as a hunter is sitting on detachable seat assembly 140 connected near the outer end of the seating platform 70 to the bottom side rail 72 of seating platform 70, the user facing the tree 300 in the climbing or lowering position. As can be seen in FIG. 9, the feet of the user are resting on standing platform 20 and positioned under foot receiving members 44b to move the standing platform 20 upward or downward with the user's feet as indicated by the arrows in FIG. 9, and the hands of the user are grasping pivot arm support members 90—90 to raise or lower seating platform 70. When the user reaches the desired height on tree 300, the user can remain seated in the position shown in FIG. 9 and use the tree 300 as cover to prevent game animals from seeing him. The user can point a firearm or bow or camera toward game on the opposite side of tree 300. Safety rail 120 functions as a back rest for the user in the position shown in FIG. 9.

As shown in FIG. 10, a user is sitting in a low position on movable seat 140 which is connected near the inner end of seating platform 70 to the bottom side rail 72 of seating platform 70 with the user's back to the tree 300 in a hunting or observing position. The feet of the user are resting on standing platform 20 near the outer end of standing platform 20, standing platform 20 and seating platform 70 being connecting together by connecting strap 160. As shown in FIG. 11, pivot arm support members 90—90 can be used as arm rests. The user may sit upright or sled movable seat 140 away from tree 300 for a more reclined position.

If desired, the user can move seating platform 70 upward until support members 90—90 are at elbow level with the user. Movable seat 140 can then be used as a back tree pad. Such a position would provide the safety rail 120, gun and quiver holders 104—104, accessory knobs 102—102 with gear attached for use at elbow level when the hunter is standing, enabling the hunter to hunt in comfort and safety. Safety rail 120 may be used as a firearm or camera rest, and as an additional safety restraint if the user stands up and should lean or fall forward away from tree 300.

Furthermore, the movable and detachable seat 140 allows the user to relocate the seat front to back or back to front without having to step over the seat 140. Stepping over a seat at elevation is a major safety hazard and bother; with the movable, detachable seat 140 of the invention, this hazard is eliminated.

As shown in FIG. 11, the user is sitting on movable seat 140 connected near the inner end of seating platform 70 to pivot arm support rail 90 of seating platform 70 with the user's back to tree 300 in a hunting or observing position. This position provides more clearance for a user such as a bow hunter who can stand up on standing platform 20 without his bow striking any part of seating platform 70.

Standing platform 20 and seating platform 70 are preferably connected together by two adjustable connecting straps 160 which connect to the outer portion of the seating platform 70 and to each pivot arm 50 of standing platform 20 as shown in FIGS. 9–11. Adjustable connecting straps 160, one on each side of platforms 20 and 70, prevent the standing platform 20 from sliding down a tree 300 when the user is sitting on seating platform 70 as shown in FIGS. 9–11 and also enables the two platforms to be snugly fastened together when in the positions shown in FIGS. 9–11. Should the standing platform 20 move past the adjusted length of straps 160, the straps 160 will force pivot arms 50—50 to grab and bite tree 300 and at the same time apply force to the outer end of seating platform 70 to cause seating platform 70 to bite into tree 300, thus virtually eliminating the possibility of sliding down a tree accidentally.

To move the standing platform 20 and/or seating platform 70 upward or downward on a tree, safety straps 160 is adjusted to be long enough the accommodate the distance each platform 20 and 70 is moved relative to the other as a user ascends or descends from a tree or pole. When the user reaches the desired height, adjustable safety straps 160 are tightened by the user to the position shown in FIGS. 9, 10, and 11 to secure the standing platform 20 and seating platform 70 at elevation for stability. Once the user climbs to elevation and stands up on standing platform 20, seating platform 70 is unstable due to its light weight. To secure the standing platform 20 and the seating platform 70, the user remains seated on the seating platform 70 when the desired elevation is reached, and the adjustable straps 160 are tightened. After tightening straps 160, when the user stands up on standing platform 20, the standing platform 20 and the seating platform 70 will be under tensile forces from straps 160, and will be bound together as one unit.

A final use for adjustable straps 160 is for securing standing platform 20 to seating platform 70 for packing. To pack the platforms together, standing platform 20 is placed in seating platform 70 and straps 160 are wrapped around both platforms. The ends of the straps 160 are then buckled together and tightened.

As can be seen from the above description of the invention, flexible connector 62 extends from the sides of standing platform 20 and seating platform 70 through guides or eyes 50d and 110d at the end of pivot arms 50 and 110 near tree contacting members 50c and 110c. Thus flexible connector 62 only contacts the trunk of tree 300 on the back side of the tree away from platforms 20 and 70 when body weight is placed each platform 20 or 70, and flexible connector 62 forces tree contacting members 50c and 110c toward the trunk of tree 300 to bite into the trunk of tree 300 to provide greatly increased stability of platforms 20 and 70, even on a leaning tree such as shown in FIG. 17. Contacting members 50c and 110c may have more aggressive shapes if desired to additional bite into tree 300.

Flexible connector 62 may be routed on the left, right, top, or bottom of the exterior of pivot arm support members 44 and 90. Flexible connector 62 is routed on the exterior of support members 44—44 and 90-9 through guides 44e—44e and 90e—90e, and on the exterior of pivot arms 50—50 and 110—110 through guides 50d—50d and 110d—110d, to reduce noise and make connection of flexible connector 62 and adjustment of flexible connector 62 easier, and to enable the user to see that connection is made. Guides 44e—44e, 90e—90e, 50d—50d, and 110d—110d are shown in the drawings as an eyebolt but may be replaced with an "C", "U" or "J" type connector guide positioned as eyebolts 50d and 110d are to cause flexible connector 62 to always pull the guide toward the trunk of tree 300.

Commonly, leveraged bite on standing and climbing platforms of the prior art is accomplished by applied pressure on the front of a tree by platform contacts and on the back of a tree by rigid "V" shaped bars, blades, flexible connectors, belts, cables or chains, whereas the pivot arms 50 and 110 of the invention provides additional bite on the sides of the tree, thereby doubling the bite for greatly enhanced stability.

Although the preferred embodiments of the invention have been described in detail above, it should be understood that the invention is in no sense limited thereby, and its scope is to be determined by that of the following claims:

What is claimed is:

1. A climbing tree stand platform for engaging a support comprising:
   a platform member having an inner end for engaging the support, an outer end, and two sides opposite one another connecting said inner end and said outer end,
   two pivot arm support members rigidly connected to the platform member and extending upward therefrom toward said inner end of said platform member wherein said pivot arm support members maintain a position substantially parallel to each other,
   two brace members, each rigidly connecting one of said pivot arm support members to said platform member,
   two substantially Y-shaped pivot arm assemblies, each having a pivot arm and a pivot arm brace rigidly connected to said pivot arm wherein each pivot arm assembly pivots about an axis adjacent to and substantially parallel with one of the respective brace members, for pivoting toward and contacting opposite sides of the support as a downward force is applied to said platform member, and
   each of said two pivot arm assemblies being adapted to receive a flexible connector removably connected to each of said two pivot arm support members for extension around the support to hold said platform member to said support.

2. The climbing tree stand of claim 1 wherein each of said pivot arms has a rigid contact member connected thereto and extending toward the support for contacting and biting into said support.

3. The climbing tree stand of claim 1 wherein said inner end of said platform member has a rigid contact member connected thereto for contacting and biting into said support connected to said inner end thereof.

4. The climbing tree stand of claim 1 wherein each of said pivot arms has a flexible connector receiving guide rigidly connected thereto for slidably receiving said flexible connector.

5. The climbing tree stand of claim 1 wherein said platform member has one of said two pivot arm support members being connected to one of said two opposite sides of said platform member and the other of said two pivot arm support members being connected to the other of said two opposite sides of said platform member.

6. A climbing tree stand for engaging a support comprising:
   a standing platform having an inner end for engaging the support and an outer end, said standing platform having two pivot arm support members rigidly connected thereto and extending upward therefrom toward said inner end of said standing platform wherein said pivot arm support members maintain a position substantially parallel to each other, two brace members, each rigidly connecting one of said pivot arm support members to said platform member, two pivot arm assemblies, each having a pivot arm having first and second ends and a pivot arm brace having a first end rigidly connected to said pivot arm and a second end spaced apart from the second end of the pivot arm wherein the second ends of the pivot arm and pivot arm brace are in substantial axial alignment and pivot about an axis adjacent to and substantially parallel with one of the respective brace members, for pivoting toward and contacting opposite sides of the support as a downward force is applied to said standing platform, each of said two pivot arm assemblies being adapted to receive a first flexible connector removably connected to each of said two pivot arm support members for extension around the support to hold said standing platform to said support; and
   a seating platform having an inner end for engaging the support and an outer end, said seating platform having two arm support members rigidly connected thereto and extending upward therefrom toward said inner end of said seating platform wherein said arm support members maintain a position substantially parallel to each other, each of said two arm support members being adapted to receive a second flexible connector removably connected to each of said arm support members for extension around the support to hold said seating platform to said support.

7. The climbing tree stand of claim 6 wherein each of said pivot arms has a rigid contact member connected thereto and extending toward the support for contacting and biting into said support.

8. The climbing tree stand of claim 6 wherein said inner end of said standing platform has a rigid contact member connected thereto for contacting and biting into said support connected to said inner end thereof.

9. The climbing tree stand of claim 6 wherein said inner end of said seating platform has a rigid contact member for contacting and biting into said support connected to said inner end thereof.

10. The climbing tree stand of claim 6 wherein said standing platform has rigid foot receiving members for receipt of each foot of the user to raise and lower said standing platform.

11. The climbing tree stand of claim 10 wherein said foot receiving members are rigidly connected to said standing platform adjacent to said inner end of said standing platform.

12. The climbing tree stand of claim 6 wherein each of said pivot arms has a flexible connector receiving guide rigidly connected thereto for slidably receiving said first flexible connector.

13. The climbing tree stand of claim 6 wherein said seating platform has two parallel seat supporting members for receipt of a removable seat.

14. The climbing tree stand of claim 6 wherein said standing platform has two sides opposite each other connecting said inner end and said outer end of said standing platform, one of said two pivot arm support members being connected to one side of said standing platform and the other of said two pivot arm support members being connected to the other side of said standing platform.

15. The climbing tree stand of claim 6 wherein said seating platform has two sides opposite each other connecting said inner end and said outer end of said seating platform.

16. The climbing tree stand of claim 6 further comprising:
   a seat assembly having
   a seating member;
   a first strap connected to a first side of said seating member;
   a connector attached to said first strap;
   a second strap connected to an opposite side of said seating member; and
   an adjustable strap receiver connected to said second strap and adapted to connect to said first connector.

17. The climbing tree stand of claim 16, wherein the first connector of the seat assembly is a hook.

18. The climbing tree stand of claim 16, wherein said seating member is substantially rectangular.

19. A climbing tree stand for engaging a support comprising:

a standing platform having an inner end for engaging the support and an outer end, said standing platform having two pivot arm support members rigidly connected thereto and extending upward therefrom toward said inner end of said standing platform wherein said pivot arm support members maintain a position substantially parallel to each other, two brace members, each rigidly connecting one of said pivot arm support members to said platform members, two pivot arm assemblies, each having a pivot arm having first and second ends and a pivot arm brace having a first end rigidly connected to said pivot arm and a second end spaced apart from the second end of the pivot arm wherein the second ends of the pivot arm and pivot arm brace are in substantial axial alignment and pivot about an axis adjacent to and substantially parallel with one of the respective brace members, for pivoting toward and contacting opposite sides of the support as a downward force is applied to said standing platform, each of said two pivot arm assemblies being adapted to receive a first flexible connector removably connected to each of said two pivot arm support members for extension around the support to hold said standing platform to said support; and a seating platform having an inner end for engaging the support and an outer end, said seating platform having two pivot arm support members rigidly connected thereto and extending upward therefrom toward said inner end of said seating platform wherein said pivot arm support members of said seating platform maintain a position substantially parallel to each other, two brace members, each rigidly connecting one of said pivot arm support members to said platform members, each of said brace members having a pivot arm and a pivot arm brace pivotally connected thereto for pivoting toward and contacting opposite sides of the support as a downward force is applied to said seating platform, each of said two pivot arms being adapted to receive a second flexible connector removably connected to each of said two pivot arm support members for extension around the support to hold said seating platform to said support.

20. The climbing tree stand of claim 19 wherein each of said pivot arms has a rigid contact member connected thereto and extending toward the support for contacting and biting into said support connected to said inner end thereof.

21. The climbing tree stand of claim 19 wherein said inner end of said standing platform has a rigid contact member connected thereto for contacting and biting into said support connected to said inner end thereof.

22. The climbing tree stand of claim 19 wherein said inner end of said seating platform has a rigid contact member for contacting and biting into said support connected to said inner end thereof.

23. The climbing tree stand of claim 19 wherein said standing platform has rigid foot receiving members for receipt of each foot of the user to raise and lower said standing platform.

24. The climbing tree stand of claim 23 wherein said foot receiving members are rigidly connected to said standing platform adjacent to said inner end of said standing platform.

25. The climbing tree stand of claim 19 wherein each of said pivot arms has a flexible connector receiving guide rigidly connected thereto for slidably receiving said respective first and second flexible connector.

26. The climbing tree stand of claim 19 wherein said seating platform has two parallel seat supporting members for receipt of a removable seat.

27. The climbing tree stand of claim 19 wherein said standing platform has two sides opposite each other connecting said inner end and said outer end of said standing platform, one of said two pivot arm support members being connected to one side of said standing platform and the other of said two pivot arm support members being connected to the other side of said standing platform.

28. The climbing tree stand of claim 19 wherein said seating platform has two sides opposite each other connecting said inner end and said outer end of said seating platform, one of said two pivot arm support members being connected to one side of said seating platform and the other of said two pivot arm support members being connected to the other side of said seating platform.

29. A climbing tree stand comprising:

a standing platform having an inner end for engaging a tree and an outer end, said standing platform having two pivot arm support members rigidly connected thereto and extending upward therefrom toward said inner end of said standing platform wherein said pivot arm support members maintain a position substantially parallel to each other, each of said pivot arm support members having a pivot arm pivotally connected thereto for pivoting toward and contacting opposite sides of said tree as a downward force is applied to said standing platform, each of said two pivot arms being adapted to receive a first flexible connector removably connected to the exterior each of said two pivot arm support members for extension around said tree to hold said standing platform to said tree;

a seating platform having an inner end for engaging said tree and an outer end, said seating platform having two arm support members rigidly connected thereto and extending upward therefrom toward said inner end of said seating platform wherein said arm support members maintain a position substantially parallel to each other, each of said two arm support members being adapted to receive a second flexible connector removably connected to each of said arm support members for extension around said tree to hold said seating platform to said tree; and said standing platform is connected to said seating platform by two adjustable removable two-ended flexible straps, each of said straps being connected at one end to said outer end of said seating platform and at the other end to one of said pivot arms of said standing platform.

30. A climbing tree stand comprising:

a standing platform having an inner end for engaging a tree and an outer end, said standing platform having two pivot arm support members rigidly connected thereto and extending upward therefrom toward said inner end of said standing platform wherein said pivot arm support members maintain a position substantially parallel to each other, each of said pivot arm support members having a pivot arm pivotally connected thereto for pivoting toward and contacting opposite sides of said tree as a downward force is applied to said standing platform, each of said two pivot arms being adapted to receive a first flexible connector removably connected to each of said two pivot arm support members for extension around said tree to hold said standing platform to said tree;

a seating platform having an inner end for engaging said tree and an outer end, said seating platform having two pivot arm support members rigidly connected thereto and extending upward therefrom toward said inner end of said seating platform wherein said pivot arm support members of said seating platform maintain a position substantially parallel to each other, each of said pivot arm support members having a pivot arm pivotally connected thereto for pivoting toward and contacting opposite sides of said tree as a downward force is applied to said seating platform, each of said two pivot arms being adapted to receive a second flexible connector removably connected to each of said two pivot arm support members for extension around said tree to hold said seating platform to said tree; and said standing platform is connected to said seating platform by two adjustable removable two-ended flexible straps, each of said straps being connected at one end to said outer end of said seating platform and at the other end to one of said pivot arms of said standing platform.

* * * * *

UNITED STATES PATENT AND TRADEMARK OFFICE
CERTIFICATE OF CORRECTION

PATENT NO. : 6,988,588 B2
DATED : January 24, 2006
INVENTOR(S) : Prejean

It is certified that error appears in the above-identified patent and that said Letters Patent is hereby corrected as shown below:

Column 1,
Line 45, delete "straps the" and insert -- straps, the --;

Column 2,
Line 10, delete "invention there" and insert -- invention, there --;

Column 4,
Line 29, delete "a";
Line 32, delete "Preferably tree" and insert -- Preferably, tree --;
Line 54, delete "connecters" and insert -- connectors --;

Column 5,
Line 67, delete "FIG." and insert -- FIGS. --;

Column 7,
Line 20, delete "firearm or bow or" and insert -- firearm, bow, or --;
Line 30, delete "connecting" and insert -- connected --;
Line 66, delete "enables" and insert -- enable --;

Column 8,
Line 8, delete "is" and insert -- are --;
Line 9, delete "enough the" and insert -- enough to --;
Line 44, delete "desired to" to -- desired, for --; and
Line 48, delete "90-9" and insert -- 90-90 --.

Signed and Sealed this

Twenty-fifth Day of April, 2006

JON W. DUDAS
*Director of the United States Patent and Trademark Office*